(No Model.)

G. RAWLINGS.
FIFTH WHEEL.

No. 547,890.  Patented Oct. 15, 1895.

Witnesses.
F. E. Downing
Harry F. Downing.

Inventor
Greenbury Rawlings

UNITED STATES PATENT OFFICE.

GREENBURY RAWLINGS, OF ARENZVILLE, ILLINOIS.

FIFTH-WHEEL.

SPECIFICATION forming part of Letters Patent No. 547,890, dated October 15, 1895.

Application filed May 20, 1895. Serial No. 550,013. (No model.)

*To all whom it may concern:*

Be it known that I, GREENBURY RAWLINGS, of the town of Arenzville, in the county of Cass and State of Illinois, have invented a new and useful Fifth-Wheel for Carriages, for which I have heretofore applied to the Commissioner of Patents of the United States for a patent, and the following is an amended specification.

The object of my invention is to reduce the friction occasioned by the turning of the tongue or shafts in buggies, carriages, and other light-running vehicles, and to obviate the necessity of the use of oil or grease in the lubrication of fifth-wheels of such vehicles. I attain these results by the mechanism illustrated in the accompanying drawings, in which—

Figure 1:
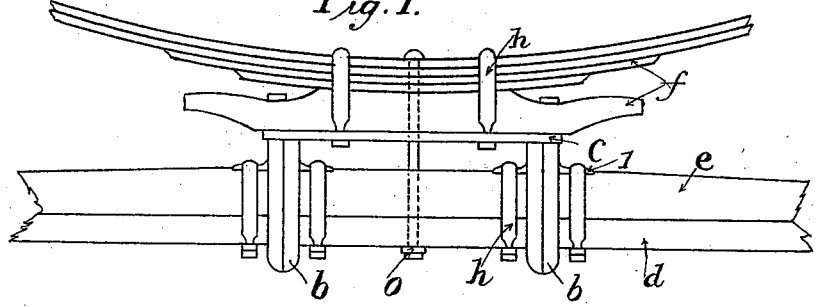
Figure 2:
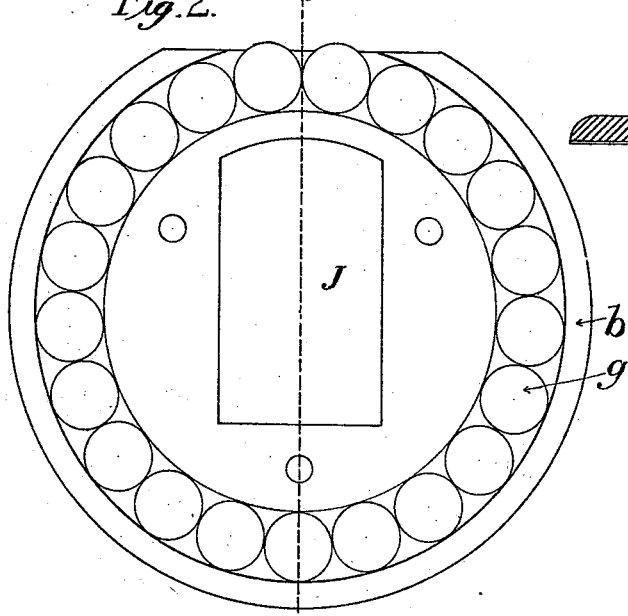
Figure 3:
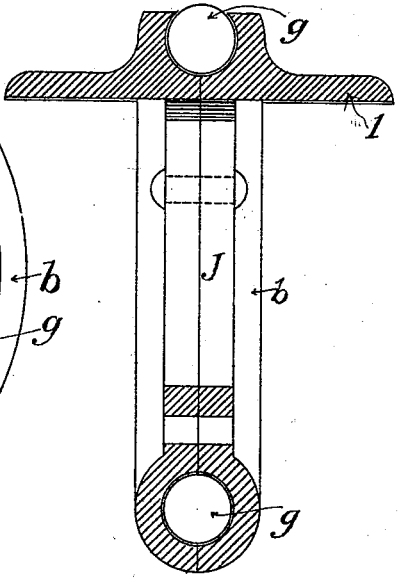
Figure 4:
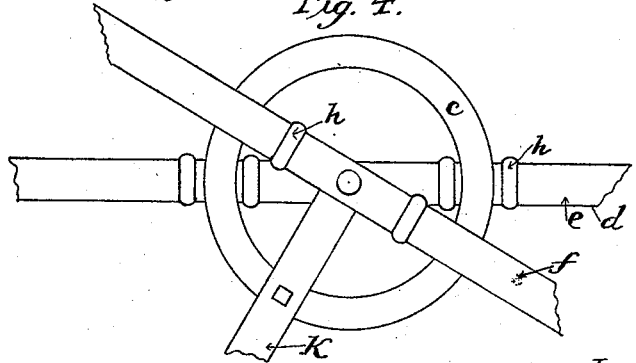

Figure 1 is a front view. Fig. 2 is an inside view of one-half of the ball-case. Fig. 3 is a cross-section of the ball-case. Fig. 4 is a top view.

Similar letters refer to like parts throughout the different views.

The ball-case is composed of two circular disks having each a groove around the outer margin forming one-half the ball-case. These disks when secured together face to face form the circular groove for containing the balls. The upper parts of the disks are cut away, so as to expose the tops of the balls, and on these balls so exposed the fifth-wheel circle rests. These disks have a mortise cut through the central part of the proper size to fit over the axle and axle-stock, and are secured thereon by means of clips passing over the lugs $l$, which project from either side of the ball-case.

The ball-case $b$ is shown in place in Fig. 1. It is more fully illustrated in Figs. 2 and 3. The opening J allows it to be placed over the axle $d$ $e$, and is secured in place by clips $h$ over lugs $l$, while the spring and spring-bar $f$ and coupling $k$ are bolted to the circle or fifth-wheel $c$ and all held together by the king-bolt $o$.

What I claim as my invention, and desire to secure by Letters Patent, is—

In a fifth wheel the ball bearing cases secured to the axle and having an edge portion cut away to expose the balls in combination with the upper fifth wheel circle adapted to rest and turn upon said balls substantially as described.

GREENBURY RAWLINGS.

Witnesses:
D. N. WALKER,
H. F. KORS.